April 23, 1940.  F. A. RENO  2,197,838
LIGHTING AND INDICATING SYSTEM
Filed Jan. 21, 1938
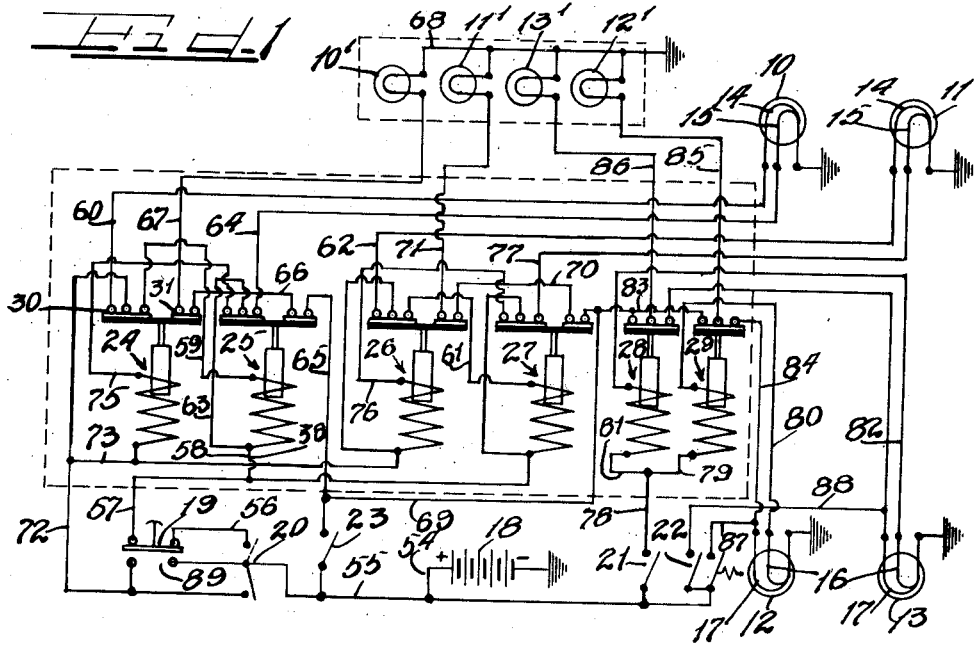
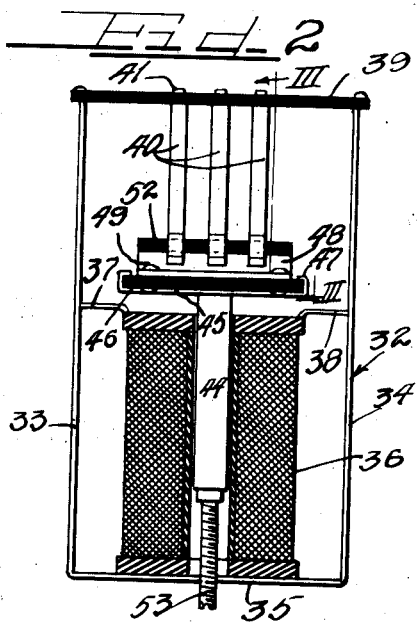
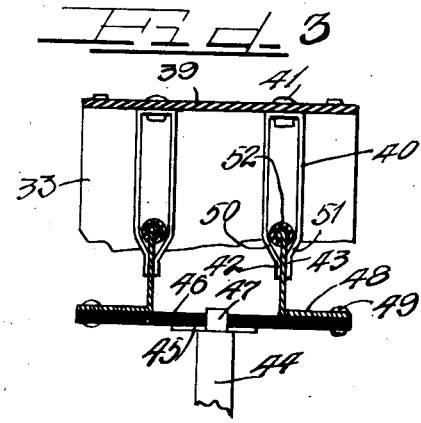
Inventor
Fred A. Reno.
by Charles Hell
Attys.

Patented Apr. 23, 1940

2,197,838

UNITED STATES PATENT OFFICE 2,197,838

LIGHTING AND INDICATING SYSTEM

Fred A. Reno, Gary, Ind.

Application January 21, 1938, Serial No. 186,109

4 Claims. (Cl. 171—97)

The present invention relates in general to a lighting and indicating system, and is in particular concerned with a system of such character that the failure of one light-producing element of the system will result in another light-producing element being substituted in its stead, and will indicate that fact visually.

The invention embodying the hereindescribed invention is susceptible of a multitude of applications and uses. It has been found to be particularly useful and advantageous when embodied in the lighting system of a vehicle, such as an automobile.

Arrangements have heretofore been proposed in connection with vehicle lighting systems, whereby upon the failure of a headlight, taillight, etc., this fact is indicated in some manner, usually by an indicating light on the dash of the vehicle.

While such an arrangement apprises the operator of a burned-out lamp, so that it may be replaced at the first opportunity, it frequently happens that a spare lamp is not readily available and the operator is forced to drive the car with, for example, a single headlight, or a single taillight. Under such conditions, the lighting is not only inadequate insofar as the particular car is concerned, thus subjecting the car to the hazard of unsafe operation, but the car likewise presents a dangerous hazard to other cars and endangers the safety of their occupants.

With a view to overcoming such conditions, the present invention proposes to provide a lighting and indicating system wherein, upon the failure of a light-producing element, another light-producing element will be immediately substituted in its stead, and the fact immediately indicated. For example, in using my invention on a vehicle, a burned-out bright headlight filament would automatically be replaced by the dim headlight filament, and a burned-out taillight filament would be replaced by the stop light filament.

It will therefore be evident that my improved system entirely eliminates the commonly called "one-eye" operation of the vehicle.

Moreover, in the event that the indicator should not function, the vehicle with one bright headlight and one dim headlight would attract the attention of a traffic policeman, who, seeing this abnormal condition, would call it to the attention of the driver, thus providing an added check on the condition of the vehicle lamps.

It is therefore a primary object of the present invention to provide an improved lighting system utilizing a double filament lamp or two separate lamps, and improved relay means arranged to automatically substitute the remaining filament or lamp for whichever lamp or filament is burned out.

A further object of the invention is to provide in a system of the hereindescribed character, improved indicating means for automatically indicating current failure in a lamp circuit for any reason, for example, burning out of the lamp filament, circuit wire breakage, etc.

A further object is to provide in such systems an indicating arrangement which will continue to indicate until the damaged lamp or circuit is repaired.

Another object is to provide a lighting system, which is particularly adapted for use in connection with vehicles, which will eliminate the so-called "one-eye" operation of the vehicle.

Still another object is to provide a lighting system utilizing a lamp substitution arrangement, wherein the character of the substituted lamp acts as an indicator to show that the system is operating abnormally.

A still further object is to provide a novel and improved relay for use in connection with a system such as described herein.

Other objects of the invention will more fully appear from the following detailed description, taken in connection with the accompanying drawing, which illustrates a preferred embodiment thereof, and in which:

Figure 1 is a schematic wiring diagram showing the electrical connections between the various instrumentalities utilized in my improved system;

Figure 2 is a view in elevation of the improved relay utilized in my system; and Figure 3 is an enlarged fragmentary side view, partly in section, showing the operative relationship of the contacts of the improved relay.

As shown on the drawing:

For purposes of illustrating my improved lighting and indicating system, the system is disclosed and described as being applied to a vehicle, such as an automobile. In general, the system is interconnected with the switches usually provided in the vehicle for controlling the headlights, taillights and stop lights of the vehicle. A plurality of magnetically actuated switches or relays are utilized for automatically carrying out the features of the system and controlling a plurality of indicating lamps. The relays may be separately housed and mounted in any convenient place on the vehicle. The indicating lamps are preferably mounted in an individual housing which is supported on the dash of the vehicle where they may be conveniently viewed by the operator. These signal lamps are interconnected with the relays in such a manner that the lamps will indicate to the operator whenever one of the filaments of the lamps becomes burned out or the circuit of the lamp filament becomes opened or otherwise damaged so that it will not carry current.

Referring to Figure 1, the vehicle lamps controlled by my improved system comprise a left headlight 10, a right headlight 11, a left rear light 12 and a right rear light 13.

In the present instance, the headlights are shown as being of the double filament type each containing a filament 14 which is energized for intense illumination and a filament 15 which is energized for reduced or dim illumination.

Likewise, the rear lamps of the vehicle are also shown as being of the double filament type, one filament as shown at 16 being energizable for the usual taillight illumination, and the other filament as shown at 17 being energizable to give increased illumination such as ordinarily embodied in the stop light of the vehicle.

Now while the vehicle lamps have been shown as of the double filament type, it will be readily apparent that the system of my invention may with equal facility be utilized where the filaments are contained in separate lamps rather than in the same lamp.

The signal lamps corresponding to the vehicle lamps are respectively indicated at 10', 11', 12' and 13'.

As in the usual installation, the vehicle lamps are arranged to be illuminated from an electrical source, in this instance, a battery 18. The usual switches of the automobile are incorporated in the system, a dimmer switch 19 which may be located for foot operation and utilized for causing dimming of brightly illuminated headlights, when desired by the operator.

Switch 20 corresponds to the usual manually controlled switch for connecting the headlights for bright or dim operation, and switch 21 is for controlling the taillights. Switch 22 is a normally open switch arranged to light the stop light filaments whenever the brake is depressed. An additional switch may also be provided, this switch being indicated at 23, for controlling the indicating lamp supply.

The control of the vehicle lamps as well as the indicating lamps is accomplished through a plurality of relays 24 to 29 inclusive. It will be noted that the relays are all similarly constructed and contain a plurality of normally closed contacts which are arranged to be actuated to open position by means of a solenoid operatively associated with the operating coil of the relay.

In the case of relays 24 to 27 inclusive, the contacts are separated into two groups, namely a triple contact group 30 and a double contact group 31. These two groups of contacts are simultaneously controlled by the operation of the relay with which they are associated, but are electrically insulated relative to each other.

In the case of relays 28 and 29, each of these relays has a triple set of contacts, but does not contain the double set as in the case of the other relays.

As more specifically shown in Figure 2, the relay comprises a U-shaped frame 32 which may be formed from a strip of suitable metal to provide spaced legs or side members 33 and 34 which are connected at their bottom ends by cross member 35.

A solenoid coil 36 is vertically supported on cross member 35 and held in position by inwardly struck fingers 37 and 38 of the side members, which engage the upper end of the coil spool and hold the coil in position relative to the frame.

The uppermost ends of the side members 33 and 34 are respectively connected to a plate 39 of suitable insulating material. This plate serves as a support for a plurality of depending U-shaped stationary contact members 40 which may be connected at its base as by a rivet terminal 41 so as to depend from the plate 39 with its ends 42 and 43 spaced therebelow.

Operatively associated with the coil 36 is a solenoid member 44 which is secured in any appropriate manner to a transversely extending bar 45, the solenoid being connected intermediate the ends of the bar. This bar forms a support for a plate 46 of insulating material, the bar being connected to the plate by end fingers 47 which are adapted to be bent around opposite edges of the plate 46 and clamped thereto as shown in Figure 2.

For simultaneous actuation, a plurality of contact members 40 may be supported from the plate 39 in aligned spaced apart relationship as shown in Figure 2.

Each set of contacts is cooperatively associated with a contact 48 carried by the plate 46. The contact 48 is of angular cross section, one leg of the angle being secured as by a rivet 49 to the plate 46, and the other leg projecting upwardly between the ends of the contact members 40.

The legs of each contact member 40 are provided with angularly disposed portions 50 and 51 which form abutments for a tubular member 52 of insulating material, which is affixed to the uppermost edge of the upright leg of the contact.

Referring to Figure 3, it will be noted that the ends 42 and 43 of the contacts 40 are normally electrically connected to contact member 48 by virtue of contact therewith, and that all the contact members 40 of a given set will be electrically interconnected. If, however, the contact member 48 is moved downwardly, which may be accomplished by energizing the coil 36 of the relay, the tubular member 52 is brought into engagement with the portions 50 and 51 of the contacts 40. This will operate to spread the ends 42 and 43 thereof apart and move them out of engagement with the vertical leg of contact 48. Under these conditions, the respective contacts 40 of the set will be electrically disconnected relative to each other.

By making the contacts 40 out of spring material, the inclined portions 50 and 51 acting against the periphery of the tubular insulating member 52, will act to raise contact 48, when the operating coil 36 of the relay is de-energized. As the contact 48 is again moved upwardly, the ends 42 and 43 of contacts 40 will again make engagement with the vertical leg of contact 48 and interconnect the contacts of the set.

In order to prevent the solenoid from moving the contacts 48 downwardly to such an extent that the tubular member 52 will be carried past the lowermost ends of the inclined portions 50 and 51, a screw member 53 is threadedly supported in the cross member 35 of the frame. The screw 53 serves to form an abutment at its upper end for the lower end of the solenoid. The amount of downward movement of the solenoid may therefore be adjusted, that is, increased or decreased, by actuating the screw 53 to raise or lower its upper end in its relation to the coil of the solenoid.

The operation of the system will now be explained.

Bright headlights

The bright headlights, that is filaments 14 of the lamps 10 and 11, may be energized by closing switch 20 in the direction shown in dotted lines in Figure 1.

In this position of switch 20, filaments 14 will be energized through the following circuits. From the positive side of battery 18, through conductor 54, conductor 55 to switch 20, conductor 56, through the upper contacts of switch 19, conductor 57, conductor 58 to one side of the operating coil of relay 25, from the other side of this coil through conductor 59 to the triple contacts of relay 24, through conductor 60 to one side of filament 14, from the other side of filament 14 to ground and thence back to the other side of battery 18.

Lamp 11 has its filament 14 energized through the following circuit: From the positive side of battery 18, conductor 54, conductor 55 to switch 20, through conductor 56, the upper contacts of switch 19, conductor 57 to one side of the operating coil of relay 27, from the other side of this coil through conductor 61 to the triple contacts of relay 26, thence through conductor 62 to one side of the filament 14 of lamp 11, from the other side of this filament to ground, and thence back to the negative side of battery 18.

Since the operating coils of relays 25 and 27 are energized, these relays will operate to open their contacts. The contacts of relays 24 and 26 will remain closed. With the filaments 14 energized, the bright headlights will be on. If for some reason the energizing circuits of these filaments should become opened, or if the filaments themselves should be burned out, there will immediately be a transfer to filament 15 in the lamp or lamps which may be burned out. For example, let it be assumed that filament 14 of lamp 10 burns out for some reason. Under this condition, the energizing circuit through the operating coil of relay 25 will be de-energized and permit the contacts of this relay to close. This operation of relay 25 will energize filament 15 of lamp 10 through the following circuit: From the positive side of battery 18, through conductor 54, conductor 55 to switch 20, through conductor 56, the upper contacts of switch 19, conductor 57, conductor 58, conductor 63 to the triple contacts of relay 25, thence through conductor 64 to one side of filament 15 of lamp 10, and thence through ground to the negative side of the battery.

The bright filament 14 of lamp 11 will continue to be energized while the dim filament 15 of lamp 10 will replace the burned-out filament 14 of lamp 10 so as to enable driving the car with two headlights instead of only one which would be the ordinary case. It will be noted that since the lamps 10 and 11 are now operating with different brilliances, this fact would serve as an indication to persons outside the vehicle that the lamps were operating abnormally. Particularly, in the case of traffic policemen, the abnormal operation would be called to the attention of the vehicle operator. This indication serves as a check on the main indicating system within the vehicle, which will now be described.

As soon as relay 25 closes its contacts, indicating lamp 10', corresponding with lamp 10, will be energized through the following circuit: From the positive side of battery 18, through conductor 54, conductor 55, through switch 23 which is closed, thence through conductor 65 to the double contacts of relay 25, thence through conductor 66 to the double contacts of relay 24, conductor 67 to one side of the filament of lamp 10', thence through conductor 68 to ground and back to the negative side of battery 18.

In the event that lamp 11 should burn out its filament 14 instead of lamp 10 as described, the relays 26 and 27 would operate in a manner similar to relays 24 and 25 just described, and would substitute the dim filament 15 for the bright filament 14 of lamp 11. In this case, however, indicating lamp 11' would be energized through the following circuit: From the positive side of battery 18, through conductor 54, conductor 55, switch 23, conductor 69, through the double contacts of relay 27, conductor 70 to the double contacts of relay 26, thence through conductor 71 to one side of the filament of lamp 11', from the other side of this filament to conductor 68, to ground and back to the negative side of battery 18.

Dim headlights

For normally energizing the dim headlight filaments 15 of lamps 10 and 11, the switch 20 is closed on the side indicated by full lines in Figure 1. Filament 15 of lamp 10 will be energized through the following circuit: From the positive side of battery 18, through conductor 54, conductor 55 to switch 20, through switch 20 to conductor 72, conductor 73 to one side of the operating coil of relay 24, from the other side of this coil through conductor 75 to the triple contacts of relay 25, through these contacts and conductor 64 to one side of filament 15 of lamp 10, from the other side of this filament to ground and thence back to the negative side of battery 18.

Relay 24 having its coil thus energized will open its contacts.

Filament 15 of lamp 11 will be energized through the following circuit: From the positive side of battery 18, through conductor 54, conductor 55 to switch 20, conductor 72, conductor 73 to one side of the operating coil of relay 26, from the other side of this coil through conductor 76 to the triple contacts of relay 27, thence through conductor 77 to one side of filament 15 of lamp 11, from the other side of this filament to ground, and thence back to the negative side of battery 18.

In the event that filament 15 of either of the lamps 10 or 11 should become burned out or the energizing circuits thereof become opened for any reason, then the operating coils of relays 24 and 26 become de-energized, depending upon which of the filaments has burned out, and permit the relay to close to immediately substitute the bright filament 14 therefor and energize the appropriate indicating lamp. For example, let it be assumed that filament 15 of lamp 10 has burned out, then filament 14 thereof will immediately be substituted, filament 14 being energized through the following circuit: From the positive side of battery 18, through conductor 54, conductor 55 to switch 20, thence through conductor 72 to the triple contacts of relay 24, which are now closed, through conductor 60 to one side of filament 14 of lamp 10, and from the other side of this filament through ground back to the negative side of battery 18.

Closing of the contacts of relay 24 will energize indicating lamp 10' through the circuit previously described therefor.

In the event that element 15 of lamp 11 should be burned out, the filament 14 thereof will immediately be substituted by the operation of relay 26, which will be similar to the operation just described for relay 24.

*Taillights*

The taillights, that is, filaments 16 of the lamps 12 and 13, are energized by the closing of a control switch such as shown at 21 which forms a part of the usual control for the vehicle lighting system.

Closing of switch 21 will energize filament 16 of lamp 12 through the following circuit: From the positive side of battery 18, through conductor 54, conductor 55 to switch 21, conductors 78 and 79 to one side of the operating coil of relay 29, from the other side of this coil through conductor 80 to one side of filament 16 of lamp 12, from the other side of this filament through ground back to the negative side of battery 18.

Filament 16 of lamp 13 will be energized through the following circuit: From the positive side of battery 18 through conductor 54, conductor 55 to switch 21, conductors 78 and 81 to one side of the operating coil of relay 28, from the other side of this coil through conductor 82 to one side of filament 16 of lamp 13, from the other side of this filament through ground back to the negative side of battery 18.

Since the filament 16 of each of the lamps 12 and 13 is energized, the operating coils of relays 28 and 29 are likewise energized and these relays will open their contacts.

With both taillights burning, should either or both of the filaments 16 become burned out or their circuits become opened, immediately the associated stop light filament 17 will be substituted therefor. For example, assuming that filament 16 of lamp 12 should burn out, filament 17 thereof will be energized through the following circuit: from the positive side of battery 18, through conductor 54, conductor 55, to switch 23, through conductor 69, conductor 83 to the triple contacts of relay 29, this relay having closed its contacts due to the deenergization of its operating coil, thence through conductor 84 to one side of filament 17 of lamp 12, from the other side of this filament through ground back to the negative side of the battery 18.

Upon the closure of the contacts of relay 29, due to the burning out of filament 16 of lamp 12, the corresponding indicating lamp 12' will be energized through the following circuit: From the positive side of battery 18, through conductor 54, conductor 55, switch 23, conductor 69, conductor 83 to the triple contacts of relay 29, thence through conductor 85 to one side of the filament of lamp 12', from the other side of this filament to conductor 68 and thence through ground back to the negative side of battery 18.

If filament 16 of lamp 13 burns out, the stop light filament 17 would immediately be substituted therefor and the proper indication made by virtue of the closing of the contacts of relay 28 in a similar manner to the closing of the contacts of relay 29 just described. In this case, the indicating lamp 13' would have its filament energized through the following circuit: From the positive side of battery 18, through conductor 54, conductor 55, switch 23, conductor 69, conductor 83, through the triple contacts of relay 28, conductor 86 to one side of the filament of lamp 13', from the other side of this filament to conductor 68, and thence through ground back to the negative side of battery 18.

*Stop light*

The stop light filaments 17 of lamps 12 and 13 are arranged to be energized in the usual manner by the actuation of a normally open switch such as shown at 22 whenever the brake pedal is depressed. Upon the closing of this switch, the filaments 17 of lamps 12 and 13 will be energized through the following circuit: From the positive side of battery 18, through conductor 54, conductor 55, switch 22, conductor 87 to one side of filament 17 of lamp 12, from the other side of this filament to ground and thence back to the negative side of battery 18. In the case of lamp 13, its filament 17 will be energized through the following circuit: From the positive side of battery 18, through conductor 54, conductor 55, to switch 22, thence through conductor 88 to one side of the filament 17 of lamp 13, from the other side of this filament to ground and thence back to the negative side of battery 18.

The auxiliary dimming switch 19, which is arranged for the usual foot operation, may be used for temporarily switching the headlights from bright to dim operation. This switch has normally open contacts 89 which may be temporarily closed to effect the same circuit connections as when switch 20 is thrown to the position shown in full lines. In throwing the switch 19 so as to close contacts 89, the circuit to the bright headlight filaments through the normally closed contacts of this switch is temporarily opened.

From the foregoing description of the operation of my system, it will be evident that when utilizing double filament lamps, the indicating lamps will also function at any time a lamp is removed from its socket while it is burning, or in the event that both filaments of a single lamp should become burned out or have their circuits opened. In the event that a circuit for a lamp is not entirely open but contains a loose connection, the vibrations at this connection will cause a flickering of the indicating lamp and thus serve to inform the operator that the trouble is in a loose connection and not because of a burned-out filament in the lamp. This acts as a means to localize the trouble in the system, so that it may be more readily found and corrected.

Although a switch 23 is shown for disconnecting the indicating circuit from the source of power supply, this switch might be eliminated, if desired. If this switch is eliminated, the operator will be unable to shut off an indicating lamp, once it has lighted due to failure in the lighting system, until the system is repaired and restored to normal condition.

From the foregoing description, it will be apparent that the present invention provides an improved lighting system utilizing a double filament lamp, or separate lamps, and improved relay means arranged to automatically substitute for whichever lamp or filament is burned out, the remaining lamp or filament; which embodies improved indicating means for automatically indicating current failure in a lamp circuit; which will continue to indicate until the damaged lamp or circuit is repaired; a system which will eliminate the so-called "one-eye" operation of vehicles; a filament substitution system in which the main filament and substituted filaments have different lighting characteristics, whereby the abnormal operation is indicated whenever a substitution takes place; and a lighting system which embodies the use of a novel and improved relay.

It is, of course, to be understood that although I have described in detail the preferred embodiment of my invention, the invention is not to be thus limited, but only insofar as defined by the scope and spirit of the appended claims.

I claim as my invention:

1. A lighting system comprising a source of electrical energy; a first relay, a second relay, each of said relays having an actuating coil and energizable to open a plurality of normally closed contacts; a first light emissive means; a second light emissive means; a first pair of parallel circuits, one of said circuits containing said first means, contacts of said first relay and the coil of the second relay in series, and the other circuit the second means and contacts of the second relay in series; a second pair of parallel circuits, one of said circuits containing said second means, contacts of the second relay and the coil of the first relay in series, and the other circuit the first means and contacts of the first relay in series; and a switch operable to selectively connect said pairs to said source.

2. A lighting system comprising a source of electrical energy; a first relay, a second relay, each of said relays having an actuating coil and energizable to open a plurality of normally closed contacts; a first light emissive means; a second light emissive means; a first pair of parallel circuits, one of said circuits containing said first means, contacts of said first relay and the coil of the second relay in series, and the other circuit the second means and contacts of the second relay in series; a second pair of parallel circuits, one of said circuits containing said second means, contacts of the second relay and the coil of the first relay in series, and the other circuit the first means and contacts of the first relay in series; a switch operable to selectively connect said pairs to said source, and an indicating circuit controlled through contacts of both of said relays.

3. A lighting system comprising a supply circuit, a relay having an actuating coil energizable to open normally closed contacts, a first lamp connected to said circuit in series with said coil, a second lamp connected to said circuit in series with said contacts, an indicating circuit energizable when said relay is de-energized, and switch means for energizing said second lamp independently of said contacts and while said contacts are open.

4. In a lighting system, a source of electrical energy, a first relay, a second relay, each of said relays having an operating coil and contacts adapted to close when the relay operating coil is de-energized and open when the operating coil is energized, a pair of lamps, one of said lamps having an energizing circuit including the operating coil of the first relay and the contacts of the second relay, the other of said lamps having an energizing circuit including the operating coil of the second relay and the contacts of the first relay, switch means for selectively energizing either of said circuits and the lamps therein, and a circuit controlled by the contacts of the relay having its operating coil in the selected circuit for energizing the lamp in the non-selected circuit, when an open circuit condition occurs in the selected circuit.

FRED A. RENO.